United States Patent Office 2,977,189
Patented Mar. 28, 1961

2,977,189
PREPARATION OF PURIFIED BRINE
Kurt Ladenburg, Chappaqua, N.Y., and Arthur Bloomberg, Roselle, N.J., assignors to International Salt Company, Inc., Scranton, Pa., a corporation of New Jersey
No Drawing. Filed Oct. 29, 1956, Ser. No. 618,667
20 Claims. (Cl. 23—89)

This invention relates to the preparation of purified brine and more particularly to the preparation of sodium chloride brine low in calcium radical from sodium chloride containing substantial quantities of water-soluble calcium compounds, such as calcium sulfate and calcium chloride as impurities.

High purity brines are required for many industrial processes, as for example in the eyectrolytic treatment of brine to produce chlorine, sodium hydroxide and/or sodium or the like, in the regeneration of zeolites for water softeners, and in many dye processes, such processes tolerating brines containing at most very small amounts of calcium impurities. These brines have been generally produced heretofore by (1) dissolving the highest available grade of purified sodium chloride in d.stilled water, (2) dissolving relatively impure grades of sodium chloride, such as rock salt containing substantial amounts of the sulfates any/or chlorides of calcium, in ava lable water and thereafter treating the resulting impure brine by a sequence of auxiliary purifying processes, such as by mixing precipitating reagents w.th the brine and removing the precipitated impurities therefrom in known manner, or (3) dissolving such impure grades of sodium chloride in the presence of an alkali metal carbonate or phosphate such as sodium carbonate or bicarbonate or monosodium, disodium or trisodium phosphate. Other methods have been proposed, but all of the aforementioned methods are subject to various disadvantages which have prevented their being more widely used.

The above-described previously employed methods (1) and (2) have the d sadvantage of requiring considerably more equipment of diverse types, labor, time and the like and are undesirably expensive. On the other hand, method (3), although relatively simple and inexpensive to operate, has been found incapable of yielding the desired highly purified br:ne substantially devoid of calcium impurities under the actual brine making conditions presently employed in most plants requiring such brines. The common practice in such plants is to mainta:n a tank or other vessel to hold up to 100 tons of impure sodium chloride, e.g. rock salt, and water to a predetermined level, for example at mid-height. The water becomes saturated with the salt and the resulting brine is drawn off from time to time in the desired amounts as needed in the plant process. The liquid level in the tank is maintained by automatic addition of fresh feed water to replace the brine drawn off.

When method (3) described above is applied in such brine making equipment, an alkali metal phosphate or carbonate in the required proportions is either admixed with the rock salt before addition of the d.ssolving feed water, or is dissolved in the feed water prior to its addition to the tank containing the rock salt. In either case, while a relatively pure brine may be initially obtained, the content of calcium in the brine being drawn off gradually increases until after only a relatively short period of time the brine obtained may be so impure as to be unfit and unsuitable for use in the plant process for which it is intended. This is apparently due to the gradual build-up of calcium impurities in the salt remaining in the dissolving tank, and the inab:lity of the alkali metal carbonate or phosphate additive to prevent the gradual solution in the brine of such increased amounts of impurities present in the salt. Since the residence time of the water in the dissolving tank is at least about 60 hours over a normal weekend cessation of plant activities, and will usually range from several hours to several days with an estimated average of about 3 days during normal plant operation depending upon its brine requirements, it will be seen that the problem of preventing an undesirable build-up of calcium impurities in the brine is indeed serious.

It is an object of this invention to provide a process, for producing a relatively pure brine, which will not be subject to the above-mentioned disadvantages. Another object of this invention is the provision of a process for producing a brine low in calcium radical from salt containing substantial quantities of relatively water-soluble calcium compounds, particularly calcium sulfate, as impurities. A further object of this invention is the provision of a process for producing a relatively pure brine, which process is suitable for commercial use in normal plant operations. Other objects and advantages will appear as the description proceeds.

The attainment of the above objects is made possible by the instant invention which comprises adding to sodium chloride containing a substantial amount of water-soluble calcium sulfate as an impurity, or to the water employed to dissolve said sodium chloride in producing brine therefrom, or to both said sodium chloride and the dissolving water, a small amount of (1) an alkali metal carbonate, and of (2) an alkali metal polyphosphate selected from the group consisting of the alkali metal pyrophosphates, hexametaphosphates and tripolyphosphates. Sodium is the preferred alkali metal, but potassium may also be employed. The process of this invention has been found to enable the sustained production of low calcium brines over extended periods of time under the conditions ex:sting in actual plant practice as described above. This is surprising and unexpected since such low calcium brines are unobtainable by use under similar conditions of either of the above defined substances (1) and (2) alone.

The term "small amount" as employed herein in referring to the said substances (1) and (2) is intended to include a range of about 0.3 to 3 g. (grams) of alkali metal carbonate per kg. (kilogram) of impure sodium chloride, and alkali metal polyphosphate in an amount equivalent to about 0.06 to 1 g. of $PO_4\equiv$ per ky. of impure sod um chloride. Amounts outside these ranges may be employed if desired, but smaller amounts would in most cases not yield brines sufficiently low in calcium radical, while greater amounts are in most cases uneconomical in view of the relatively smaller increment in purity of the brines attainable thereby.

Embodiment A

As a further feaature of this invention, it has been found that additional advantages and improved results are obtained when the process of the instant invention is effected in accordance with the preferred embodiment A by spraying a highly concentrated aqueous solution of alkali metal carbonate and polyphosphate as defined above onto the salt containing calcium impurity and then admixing fresh feed water with the treated salt for dissolving the same to produce the desired low calcium brine. By such method, the surfaces of the individual particles of impure salt are provided with a coating containing the defined alkali metal carbonate and polyphosphate, thereby enabling these substances in the coating to exert their maximum inhibiting effect in acting to prevent solution of substantial amounts of calcium impurities contained in the salt. By applying these substances in th : form of a highly concentrated or saturated spray, a minimum amount of water is added to the impure salt whereby caking of the impure salt is prevented, normal handling thereof is not interfered with, and the treated impure salt need not be subjected to a separate drying process. It will be understood, however, that such a drying process, employing any heat source operating by radiation, conduction and/or convection, may be applied if desired. This method of carrying out the process of the instant invention is further advantageous in that it reduces the amount of dusting normally encountered in the handling of the salt and may be effected at the original point of salt production and/or distribution, the brine production therefrom being thereafter readily completed by the admixture therewith of fresh feed water in the usual manner. This preferred embodiment of the instant invention may be accomplished, for example, by dispensing the calculated amount of concentrated aqueous solution containing alkali metal carbonate and polyphosphate in the proper proportions in the form of an atomized spray within an enclosed area onto the impure salt as it is carried through said area on a moving belt or conveyor, the spray being adjusted to minimize losses and uniformly coat the surfaces of the salt particles with the required amount of alkali metal carbonate and polyphosphate. The treated salt may then be directly and continuously loaded for shipment to the brine maker.

In this embodiment of the instant invention, the preferred alkali metal polyphosphate is sodium hexametaphosphate in view of its effectiveness in enabling the attainment of low calcium brines and its high water-solubility whereby a more highly concentrated aqueous spray containing a smaller amount of water may be employed.

*Embodiment B*

In this embodiment for carrying out the process of the invention, the required proportions and amounts of alkali metal carbonate and polyphosphate, in dry solid particulate (powder) or pellet or other shaped form or the like, may be added to and admixed with the salt containing calcium impurity, and the thus treated impure salt then admixed with fresh feed water. This method is usually less effective than the preferred embodiment A described above since the alkali metal carbonate and polyphosphate tends to settle and/or segregate in the impure salt mass during shipping and handling, whereby the attainment of the desired maximum inhibiting action, believed to occur at the surfaces of the salt particles, may be prevented.

*Embodiment C*

In this embodiment for carrying out the process of the invention, the required proportions and amounts of alkali metal carbonate and polyphosphate may first be dissolved in the brine making feed water, and the treated feed water then admixed with the salt containing calcium impurity to produce the desired low calcium brine. Admixture of at least about one part by weight of the impure salt containing calcium impurity with about three parts of this treated feed water enables the production of a low calcium saturated brine.

The process of the instant invention may be employed in producing low calcium brines from impure sodium chloride in any particulate form. Since the object of the process of the instant invention is the production of a low calcium brine, the impure salt selected for use herein should preferably contain as low a content of calcium sulfate impurity as possible or available, as for example rock salts containing as mined about 0.5 to 1% calcium sulfate by weight. It will be understood, however, that the instant process is also operative in producing relatively low calcium brines from rock salts containing as much as 2 to 3% calcium sulfate by weight. Highly advantageous results are obtained with rock salt, the particles of which have an average diameter of about 0.25 to 0.5 inch. When the available feed water employed in making the brine is a relatively hard water containing higher amounts of calcium compounds in solution, proportionately higher amounts of alkali metal carbonate and polyphosphate within the stated ranges should be employed.

It will be understood that the process of this invention may be utilized in accordance with any one of the above-described Embodiments A, B or C, or any combination thereof, provided that the total proportions of alkali metal carbonate and polyphosphate by weight of the impure salt fall within the stated ranges. The low calcium brines produced herein have an alkaline nature attributable to the substances (1) and (2), and for similar reasons, the treated feed water of Embodiment C containing such substances is also alkaline (pH>7). Neutralization of the thus produced low calcium brines may if desired be readily accomplished by admixture therewith of a suitable acidic substance such as hydrochloric acid or the like. Any residual solid material present in the brine produced in accordance with this invention may be separated in any suitable matter, such as by filtration, settling, decantation and/or centrifugation or the like.

The following examples in which parts are by weight unless otherwise indicated, are illustrative of the instant invention and are not to be regarded as limitative:

EXAMPLE I

In each of the examples in the following table, 1 kg. of rock salt containing about 1% of impurities at least half of which is calcium sulfate is placed in a 1 qt. wide-mouthed bottle. To this is added 265 ml., sufficient to make about 300 ml. of saturated brine, of an aqueous solution of the particular additive or additives in the given amounts, the liquor level being approximately at the top of the salt. Samples of the saturated brine in the bottle are taken at the end of the stated periods of time, filtered, analyzed for calcium and reported as p.p.m. (parts per million) calcium in the brine. All polyphosphate additives are reported in terms of grams $PO_4^{\equiv}$ per kg. of salt dissolved. In the table, Pyro means tetrasodium pyrophosphate, Hexa Meta means sodium hexametaphosphate and Tri Poly means sodium tripolyphosphate.

TABLE

| Example | Additive, g./kg. salt dissolved | | | | p.p.m. Ca in brine after— | | |
|---|---|---|---|---|---|---|---|
| | $Na_2CO_3$ | equiv. $PO_4^{\equiv}$ | | | 15 min. | 24 hr. | 72 hr. |
| | | Pyro | Hexa Meta | Tri Poly | | | |
| 1 | | | | | 283 | 710 | 1,045 |
| 2 | 1.01 | | | | 15.9 | 616 | 970 |
| 3 | 1.42 | | | | 8.5 | 598 | 1,125 |
| 4 | 2.49 | | | | | 466 | 760 |
| 5 | | .567 | | | 37.8 | 529 | |
| 6 | | | .567 | | 127 | 249 | |
| 7 | | | | .567 | 109 | 137 | |
| 8 | .945 | .567 | | | 19.8 | 283 | |
| 9 | .945 | | .567 | | 51.4 | 78.5 | |
| 10 | .945 | | | .567 | 53.1 | 59.8 | |

From the above table, it will be seen that greatly improved results with respect to reduction of the calcium content of the brine are obtained by use of a combination of sodium carbonate and one of the indicated polyphosphates (Examples 8, 9 and 10) as compared with results obtained by use of the sodium carbonate or polyphosphate alone (Examples 2–7). The table also shows the ineffectiveness of sodium carbonate alone as an additive under actual plant conditions and the fallacy of evaluating an additive by consideration of its calcium reducing properties after only a 15 minute period. Thus, while the p.p.m. of calcium in the brine after a 15 minute time of contact is reduced from 283 (Example 1, the control, in which no additive is used) to 8.5 when 1.42 g. of sodium carbonate per kg. of dissolved salt is employed (Example 3), the use of the same amount of sodium carbonate yields after 72 hours a brine actually having a calcium content (1125 p.p.m.) higher than that of the control (1045 p.p.m.).

EXAMPLE II

To 40 gal. of water is added with agitation 100 lbs. of anhydrous sodium carbonate. To the resulting solution is slowly added 22.5 lbs. of sodium hexametaphosphate, granular, anhydrous, agitation being continued until all is dissolved. This solution is placed in a stainless steel or plastic lined container in an enclosed space and evenly distributed in the form of a fine spray over 50 tons of Avery, Louisiana rock salt containing about 1.1% impurities consisting predominantly of calcium sulfate. The rock salt is carried on a conveyor belt through the enclosed space and beneath the container containing the spray solution, the speed of the belt and the rate of the spray being adjusted and correlated to obtain even distribution of the entire solution over the entire 50 tons of rock salt. The treated salt is placed in a concrete storage type lixiviator (e.g. International Salt Co. Lixator, described in their bulletin "The Lixate Process," (1955), provided with a bottom outlet, and water is added to a level just below the salt level. The brine formed in the lixiviator passes through the layers of salt at the bottom as it is withdrawn, any solid matter suspended therein being thus filtered out to yield a clear brine. The brine level in the vessel is maintained by automatically controlled addition of water as the brine is drawn off. Over a six week period, the calcium content of the brine so produced in accordance with this invention varies from about 75 to about 100 p.p.m. Over a similar period, brine obtained in a similar manner but from Avery rock salt which has not been pretreated as described above has a calcium content ranging in excess of about 475 p.p.m.

This invention has been disclosed with respect to certain preferred embodiments, and various modifications and variations thereof will become obvious to persons skilled in the art. It is to be understood that such modifications and variations are to be included within the spirit and scope of this invention.

We claim:

1. In a method of preparing brine in which the materials brought into contact to form said brine are water and solid sodium chloride containing a substantial amount of water-soluble calcium sulfate as an impurity, the improvement which comprises adding to one of said materials before bringing said materials into contact (1) an alkali metal carbonate, and (2) an alkali metal polyphosphate selected from the group consisting of the alkali metal pyrophosphates, alkali metal hexametaphosphates and alkali metal tripolyphosphates, and thereafter bringing said materials into contact to dissolve said sodium chloride in said water whereby to form a brine low in calcium radical, said alkali metal carbonate being employed in an amount ranging from about 0.3 to 3 grams, and said alkali metal polyphosphate being employed in an amount equivalent to about 0.06 to 1 gram of $PO_4\equiv$, per kilogram of dissolved sodium chloride.

2. A method as defined in claim 1 in which said alkali metal carbonate is sodium carbonate.

3. A method as defined in claim 1 in which said alkali metal polyphosphate is tetrasodium pyrophosphate.

4. A method as defined in claim 1 in which said alkali metal polyphosphate is sodium hexametaphosphate.

5. A method as defined in claim 1 in which said alkali metal polyphosphate is sodium tripolyphosphate.

6. A method of preparing purified brine comprising spraying solid sodium chloride containing a substantial amount of water-soluble calcium sulfate as an impurity with a concentrated aqueous solution containing (1) an alkali metal carbonate, and (2) an alkali metal polyphosphate selected from the group consisting of the alkali metal pyrophosphates, alkali metal hexametaphosphates and alkali metal tripolyphosphates, and then dissolving the treated sodium chloride in water to produce a brine low in calcium radical, said alkali metal carbonate being employed in an amount ranging from about 0.3 to 3 grams, and said alkali metal polyphosphate being employed in an amount equivalent to about 0.06 to 1 gram of $PO_4\equiv$, per kilogram of dissolved sodium chloride.

7. A method as defined in claim 6 in which said alkali metal carbonate is sodium carbonate.

8. A method as defined in claim 6 in which said alkali metal polyphosphate is tetrasodium pyrophosphate.

9. A method as defined in claim 6 in which said alkali metal polyphosphate is sodium hexametaphosphate.

10. A method as defined in claim 6 in which said alkali metal polyphosphate is sodium tripolyphosphate.

11. A method of preparing purified brine comprising admixing solid sodium chloride containing a substantial amount of water-soluble calcium sulfate as an impurity with (1) an alkali metal carbonate, and (2) an alkali metal polyphosphate selected from the group consisting of the alkali metal pyrophosphates, alkali metal hexametaphosphates and alkali metal tripolyphosphates, and then dissolving the resulting admixture in water to produce a brine low in calcium radical, said alkali metal carbonate being employed in an amount ranging from about 0.3 to 3 grams, and said alkali metal polyphosphate being employed in an amount equivalent to about 0.06 to 1 gram of $PO_4\equiv$, per kilogram of dissolved sodium chloride.

12. A method of preparing purified brine comprising dissolving solid sodium chloride containing a substantial amount of water-soluble calcium sulfate as an impurity in water containing (1) an alkali metal carbonate, and (2) an alkali metal polyphosphate selected from the group consisting of the alkali metal pyrophosphates, alkali metal hexametaphosphates and alkali metal tripolyphosphates to produce a brine low in calcium radical, said alkali metal carbonate being employed in an amount ranging from about 0.3 to 3 grams, and said alkali metal polyphosphate being employed in an amount equivalent to about 0.06 to 1 gram of $PO_4\equiv$, per kilogram of dissolved sodium chloride.

13. A method as defined in claim 12 in which said alkali metal carbonate is sodium carbonate.

14. A method as defined in claim 12 in which said alkali metal polyphosphate is tetrasodium pyrophosphate.

15. A method as defined in claim 12 in which said alkali metal polyphosphate is sodium hexametaphosphate.

16. A method as defined in claim 12 in which said alkali metal polyphosphate is sodium tripolyphosphate.

17. A method as defined in claim 11 in which said alkali metal carbonate is sodium carbonate.

18. A method as defined in claim 11 in which said alkali metal polyphosphate is tetrasodium pyrophosphate.

19. A method as defined in claim 11 in which said alkali metal polyphosphate is sodium hexametaphosphate.

20. A method as defined in claim 11 in which said alkali metal polyphosphate is sodium tripolyphosphate.

References Cited in the file of this patent

UNITED STATES PATENTS

| | | |
|---|---|---|
| 2,108,783 | Smith | Feb. 15, 1938 |
| 2,374,100 | Jackson | Apr. 17, 1945 |
| 2,433,601 | Comstock | Dec. 30, 1947 |
| 2,902,418 | Burns | Sept. 1, 1959 |

OTHER REFERENCES

Kirk et al.: "Encyclopedia of Chemical Technology," vol. 10, 1953, Interscience Encyclopedia Inc., N.Y., p. 437.

Van Wazer: "Phosphorus and Its Compounds," Interscience Publ. Inc., N.Y., 1958, vol. 1, p. 776.

Jacobsen: "Encyclopedia of Chemical Reactions," vol. II, p. 97 (1948). Published by Reinhold Publ. Co., N.Y.